UNITED STATES PATENT OFFICE.

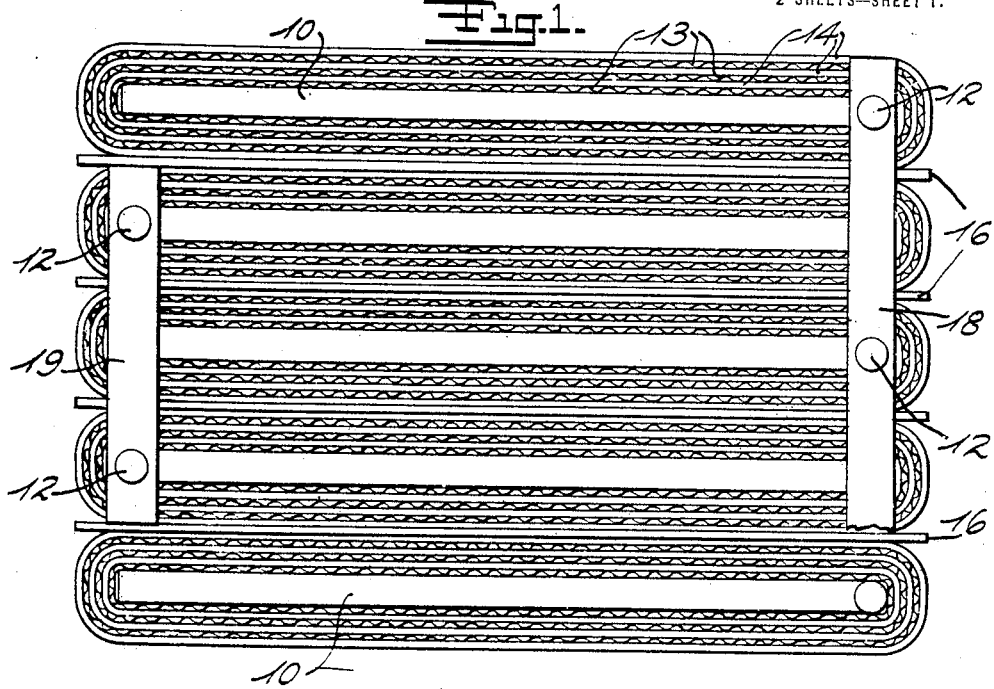
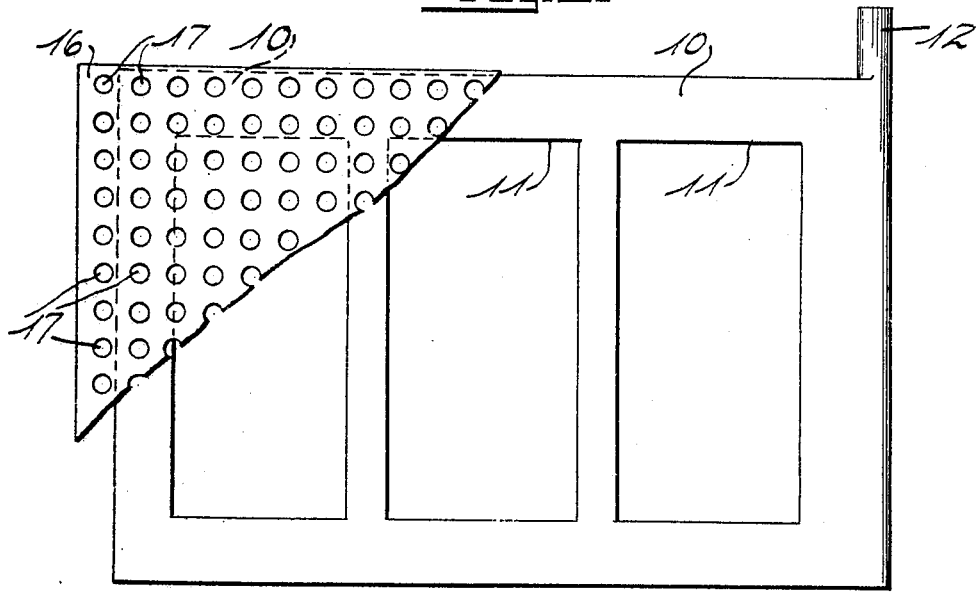

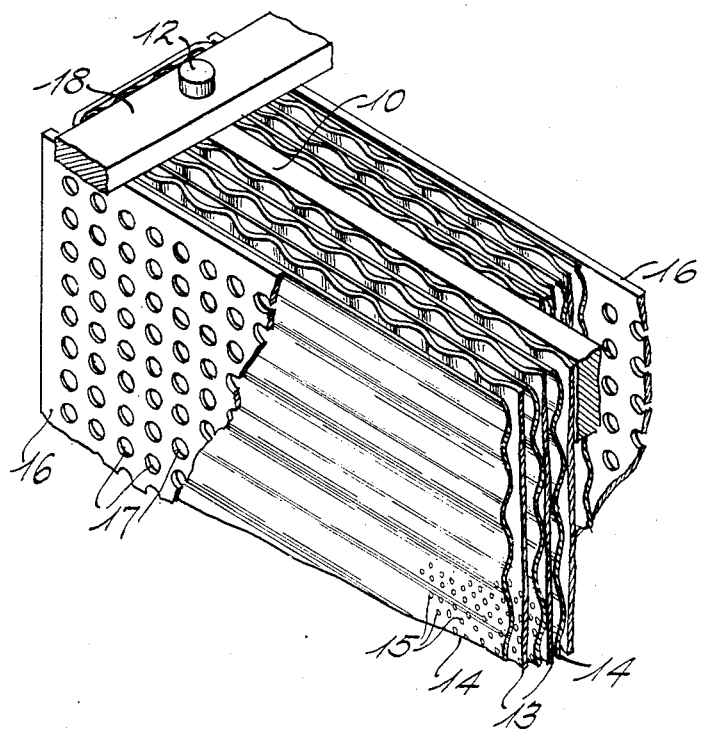

JOHN H. MURPHY, OF NEW YORK, N. Y.

STORAGE BATTERY.

1,376,566.  Specification of Letters Patent.  Patented May 3, 1921.

Application filed May 12, 1920. Serial No. 380,880½.

*To all whom it may concern:*

Be it known that I, JOHN H. MURPHY, a citizen of the United States, and a resident of the city of New York, county of Bronx, and State of New York, have invented a new and useful Improvement in Storage Batteries, of which the following is a full, clear, and exact description.

My invention relates to improvements in storage batteries, and the general object of my invention is to produce a simple, strong, durable, compact and highly efficient storage battery. More particularly my invention is intended to provide a generally rectangular battery in which each element is oblong and without a hollow core, but with a central lead grid serving also as a brace against which outer layers of oppositely corrugated and perforated lead plates are placed, thus getting great surface as well as strength. In consonance with this idea I make my battery cells of a series of elements, each comprising a substantial and preferably solid lead plate which forms a core, and which is provided with large openings for the free passage of electrolyte through it, and around this core I place a series of layers of thin corrugated and perforated lead in the form of sheets. Several of these elements are placed side by side, and the positive and negative elements are connected by suitable locking plates or connectors, and separated by a perforated insulator. As a result I get a battery in which the elements are arranged with the utmost compactness, are exceedingly strong, have an enormous surface by reason of the thin lead plates, and are likewise very strong because the lead plates are corrugated so that adjacent plates have their corrugations running in different directions in order that they may cross, all of which will be more clearly understood from the description which follows.

Reference is to be had to the accompanying drawings forming a part of this specification, in which similar reference characters indicate corresponding parts in all the views.

Figure 1 is a broken plan view of a series of battery elements suitably connected up.

Fig. 2 is a broken side elevation showing the arrangement and construction of one of the insulator plates and the lead plate or core, and Fig. 3 is a broken perspective view showing the general arrangement of the several plates of one of the battery elements.

In constructing the battery I provide each element with a core which is formed of a preferably flat solid lead plate 10 which should be of open work construction and which is preferably in the form of a grid, having large openings 11 therethrough. At one upper corner the plate 10 is provided with a stud 12 which is preferably integral with the plate and which affords a suitable means for locking it, and connecting with it an adjacent plate of another element. Around this core I wrap a series of thin corrugated lead sheets 13 and 14, with the corrugations of adjacent sheets crossing each other, and these sheets are perforated as shown at 15. The sheets 13 and 14 are preferably not spirally wound, but a pair of the sheets with opposite corrugations as specified, are wound around the plate 10 so as to lie flat against it, then another pair of sheets is applied, and so on, any necessary number being used. The several elements are separated by plates 16 of hard rubber or other insulating material which is perforated as shown at 17.

In uniting the several elements to form a battery they are placed side by side as in Fig. 1, with the elements separated by the insulators 16 which prevents short circuiting, and the positive elements are connected by locking plates 18 having holes therethrough which receive the studs 12 of the positive elements, thus connecting all the positive elements of the cell, and a similar connector 19 connects the studs 12 of the negative elements. Suitable connecting wires can be connected in any usual or preferred manner with the locking plates 18 and 19.

It will be seen by this arrangement that where the several elements are united as in Fig. 1, they provide an exceedingly compact and generally rectangular battery, and this is desirable because it can be so readily packed in connection with other cells, and obviously any suitable casing can be used. Moreover by having the central core or plate 10 and the sheets corrugated in crossing as shown, I get the advantage of great strength and large surface.

A still further advantage of the construction is that this battery can be used without paste, because of its large surface and the freedom with which the acid can flow through all parts of the battery and thus come in contact with so large a surface. I find that a battery of this type also obviates the difficulty of buckling or disintegrating of the plates, that it has a long life, and is highly efficient.

It will be noticed that by the construction shown I get a generally rectangular battery with each element of oblong shape, and without any waste of space, in the form of a hollow core. Furthermore, I utilize the central lead plate or grid to act as a brace, and thus I get great economy of space, extraordinarily large surface, and unusual strength.

I claim:—

1. A storage battery element of oblong shape comprising a lead plate with openings therethrough, and layers of thin corrugated and perforated lead arranged in pairs on both sides of the core and in close contact therewith, each pair of plates having the corrugations so disposed as to cross each other.

2. A storage battery according to claim 1 characterized by the further fact that the thin lead plates are extended around the ends of the core.

3. A storage battery of generally rectangular shape composed of a series of elements each comprising a flat lead core with openings therethrough, and layers of thin corrugated and perforated lead on both sides of the core, the sheets being arranged in pairs with the corrugations of each pair crossing, and each element thus formed being oblong in shape with flat sides, whereby the several elements may be closely packed.

4. A storage battery according to claim 3 characterized by the further fact that the lead cores of the positive and negative elements have integral lugs projecting from one edge thereof, and a locking plate connects the lugs of the positive elements, and a second locking plate connects the lugs of the negative elements.

5. A storage battery of generally rectangular shape composed of a series of generally flat oblong elements each comprising a flat lead core with openings therethrough, and layers of thin corrugated and perforated lead on both sides of the core, the sheets being arranged in pairs with the corrugations of each pair crossing, whereby the several elements may be closely packed, and perforated sheets of insulating material separating the several elements.

JOHN H. MURPHY.

Witnesses:
WARREN B. HUTCHINSON,
ROBT. F. CONLEY.